(12) United States Patent
Piechocki et al.

(10) Patent No.: US 10,584,261 B2
(45) Date of Patent: Mar. 10, 2020

(54) HIGH SOLIDS EPOXY COATINGS

(71) Applicant: Blue Cube IP LLC, Clayton, MO (US)

(72) Inventors: Christian Piechocki, Marienthal (FR); Ray E. Drumright, Midland, MI (US); Sandrine Sinsoulieu, Le Bar sur Loup (FR); Erin B. Vogel, Midland, MI (US); Yinzhong Guo, Pearland, TX (US)

(73) Assignee: Blue Cube IP LLC, St. Louis, MO (US)

( * ) Notice: Subject to any disclaimer, the term of this patent is extended or adjusted under 35 U.S.C. 154(b) by 0 days.

(21) Appl. No.: 14/651,061

(22) PCT Filed: Dec. 5, 2013

(86) PCT No.: PCT/US2013/073255
§ 371 (c)(1),
(2) Date: Jun. 10, 2015

(87) PCT Pub. No.: WO2014/093115
PCT Pub. Date: Jun. 19, 2014

(65) Prior Publication Data
US 2015/0329739 A1   Nov. 19, 2015

Related U.S. Application Data

(60) Provisional application No. 61/737,321, filed on Dec. 14, 2012.

(51) Int. Cl.
C09D 163/00    (2006.01)
C08G 59/24    (2006.01)
C08G 59/22    (2006.01)

(52) U.S. Cl.
CPC ......... *C09D 163/00* (2013.01); *C08G 59/226* (2013.01); *C08G 59/24* (2013.01)

(58) Field of Classification Search
CPC ............... C08L 63/00; C09D 163/00
See application file for complete search history.

(56) References Cited

U.S. PATENT DOCUMENTS

| | | | |
|---|---|---|---|
| 8,318,834 B2 | 11/2012 | Hefner et al. | |
| 2002/0127407 A1* | 9/2002 | Huang | B29C 67/246 428/414 |
| 2003/0135059 A1* | 7/2003 | Matsumura | C07D 303/24 549/512 |
| 2004/0031952 A1* | 2/2004 | Oosedo | C08G 59/24 252/588 |
| 2011/0039982 A1* | 2/2011 | Hefner, Jr. | C08G 59/04 523/400 |
| 2011/0040046 A1* | 2/2011 | Hefner, Jr. | C08G 59/182 525/533 |
| 2011/0046266 A1* | 2/2011 | Hefner, Jr. | C08G 59/226 523/400 |
| 2011/0220513 A1* | 9/2011 | Niazimbetova | C07D 235/08 205/297 |
| 2011/0220514 A1* | 9/2011 | Niazimbetova | C07D 233/02 205/297 |
| 2013/0048505 A1* | 2/2013 | Niazimbetova | C25D 3/38 205/297 |
| 2013/0241086 A1* | 9/2013 | Sakane | C08G 59/24 257/788 |
| 2014/0128510 A1* | 5/2014 | Kameyama | C08G 59/24 523/451 |
| 2014/0179828 A1* | 6/2014 | Hefner, Jr. | C08G 59/50 523/400 |
| 2014/0275342 A1* | 9/2014 | Guo | C08G 59/1438 523/400 |
| 2014/0275343 A1* | 9/2014 | Hefner, Jr. | C08G 59/1477 523/427 |
| 2015/0225359 A1* | 8/2015 | Potisek | C07D 301/03 549/512 |
| 2015/0225603 A1* | 8/2015 | Vogel | C08G 59/24 523/427 |
| 2015/0225606 A1* | 8/2015 | Berger | C08G 18/6659 428/425.1 |
| 2015/0240111 A1* | 8/2015 | Vogel | C08G 59/24 523/429 |
| 2016/0009947 A1* | 1/2016 | Sugiyama | C08G 59/5033 257/783 |
| 2016/0289492 A1* | 10/2016 | Guo | C07D 303/30 |

FOREIGN PATENT DOCUMENTS

| | | |
|---|---|---|
| EP | 0590975 | 4/1994 |
| EP | 2031023 A1 | 3/2009 |
| JP | 2003073453 A | 3/2003 |
| JP | 2008012741 A | 1/2008 |
| JP | 2010226745 A | 10/2010 |
| JP | 2012092247 A | 5/2012 |
| WO | WO 2009142900 A1 | 11/2009 |
| WO | WO 2014093115 A2 | 6/2014 |

OTHER PUBLICATIONS

English Machine translation of JP 2003-073453. Original Japanese document published Mar. 12, 2003. Translation printed Dec. 15, 2016.*
Lee, H. and Neville, K., Handbook of Epoxy Resins, McGraw-Hill Book Company, New York, 1967, Chapter 2, pp. 2-1 to 2-27.
European Patent Office, International Search Report for PCT/US2013/073255 dated Oct. 16, 2014.
European Patent Office, Written Opinion of the International Searching Authority for PCT/US2013/073255 dated Jun. 14, 2015.
European Patent Office, International Preliminary Report on Patentability for PCT/US2013/073255 dated Jun. 16, 2015.

* cited by examiner

*Primary Examiner* — Megan McCulley
(74) *Attorney, Agent, or Firm* — Husch Blackwell LLP

(57) ABSTRACT

A coating composition including a blend of at least two or more epoxy resins, wherein at least one of the epoxy resins comprises (i) a CHDM epoxy resin having less than about 2 wt % total chlorine content; and wherein at least one of the epoxy resins comprises (ii) at least one other epoxy resin other than the epoxy resin in component (i); a curable coating composition including (a) the above blend of epoxy resins and (b) at least one amine curing agent; a thermoset coating product prepared from the above curable composition; and a process for preparing the above compositions and a coating therefrom.

12 Claims, 3 Drawing Sheets

Comparative Example C

Comparative Example B

Comparative Example D

Example 2

Comparative Example E

Comparative Example F

Comparative Example G

Example 3

HIGH SOLIDS EPOXY COATINGS

FIELD

The present invention is related to a curable epoxy resin composition and thermosets prepared from the curable composition. More specifically, the present invention is related to a high solids (for example greater than 70% solids) curable epoxy resin coating composition; and an epoxy coating having good water resistance, chemical resistance, and corrosion resistance.

BACKGROUND

Epoxy resin compounds are used in a wide variety of applications including in coating formulations or compositions for coating applications. While some epoxy resins such as epoxy novolac resins show good chemical resistance properties, such epoxy resins are very viscous and cured coatings prepared from these epoxy resins are very brittle with low impact resistance and poor damage tolerance.

Typically, epoxy resins that are very viscous or contain high solids will necessitate the use of solvents to reduce the initial viscosity of the formulated epoxy resin, for example to below 2000 mPa-s at 25° C. An epoxy resin with a lower viscosity facilitates handling a curable composition containing such low viscosity epoxy resin and facilitates applying the composition as a coating to a substrate. However, the solvents, used to reduce the viscosity of the epoxy resins, are usually a source of undesirable volatile organic compounds (VOCs) when using a solvent-borne composition. Therefore, heretofore attempts have been made to avoid using a solvent in a curable epoxy resin composition.

For example, EP590975 (A1) discloses a low viscosity substantially solvent-free one-component type epoxy resin adhesive composition including (a) 100 parts of a conventional epoxy resin such as a bisphenol A or a bisphenol F type epoxy resin; (b) 5-100 parts of a reactive diluent such as cresol glycidyl ether or cyclohexanedimethanol diglycidyl ether with a viscosity of less than 1,000 mPa-s at room temperature (about 25° C.); and (c) 1-100 parts of a microencapsulated amine latent curing agent. Thus, the solids content of the composition disclosed in EP590975 (A1) is essentially 100%. EP590975 (A1) also describes blending a conventional epoxy resin with cyclohexanedimethanol epoxy resin (at a concentration of approximately 5 wt % to 50 wt %) to reduce viscosity. However, the composition of EP590975 (A1) is used as an adhesive, not as a coating. In addition, the composition disclosed in EP590975 (A1) does not have the low chloride levels or purity levels required for meeting the performance properties of the resulting coating made from such a composition.

The use of reactive diluents in coating compositions also has some disadvantages. For example, reactive diluents can reduce the performance properties (for example, chemical resistance, impact resistance, water resistance, and corrosion resistance) of the resulting coating made from such a composition containing reactive diluents.

U.S. Pat. No. 8,318,834 discloses an epoxy resin reactive diluent composition including (A) an epoxy resin diluent such as a cis, trans- 1, 3- and 1, 4-cyclohexanedimethylether moiety; and (B) a resin compound including one or more epoxy resins other than the epoxy resin diluent (A). The above epoxy resin reactive diluent composition is combined with a curing agent and/or a curing catalyst therefore to form a curable epoxy resin composition. The curable epoxy resin composition can then be cured to form a cured epoxy resin. U.S. Pat. No. 8,318,834 does not disclose 1,4-CHDM epoxy resin, an isomer of UNOXOL epoxy resin.

Others heretofore have used blends of epoxy resins in an attempt to form a curable epoxy resin composition useful for applications other than coatings and without the disadvantages above. For example, JP08012741 and JP10226745 disclose blending a conventional epoxy resin with cyclohexane dimethanol diglycidyl ether as a diluent (33 wt % to 60 wt %) to reduce viscosity and formulate a low viscosity liquid epoxy blend composition used as an impregnant for electronic parts applications. The composition of JP08012741 and JP10226745 contains 100 parts of bisphenol A epoxy resin; 50 parts to 150 parts of cyclohexane dimethanol diglycidyl ether, a ratio of equivalents of acid anhydride type curing agent to epoxy groups of from 0.8:1 to 1.1:1; and 0.1 part to 5 parts of a curing promoter. JP08012741 and JP10226745 do not disclose the use of an epoxy resin composition for a coating application.

With regard to viscosity, JP08012741 describes a low viscosity epoxy composition having a viscosity of less than 300 mPa-s as measured with a B-type viscometer at 25° C. And, JP10226745 describes a formulated low viscosity epoxy composition with a viscosity of less than 200 mPa-s at 25° C. as measured with an E-type viscometer. JP10226745 further discloses a pot-life of the composition which is defined as the time it takes the viscosity of the formulated composition to reach 1,000 mPa-s after keeping the composition at 40° C., and wherein the viscosity is measured at 25° C. with an E-type viscometer.

In addition, curing of the composition disclosed in JP08012741 and JP10226745 is carried out with an anhydride curing agent and not with an amine curing agent. Curing of the composition disclosed in JP08012741 and JP10226745 is forced at an elevated temperature. For example, the curing temperature of the composition disclosed in JP08012741 is 100° C. to 130° C. (by immersing a preheated film condenser to 100° C. to 130° C. into 20° C. to 50° C. liquid epoxy compositions). The composition of JP08012741 includes a combination of an epoxy resin, cyclohexane dimethanol diglycidyl ether, anhydride curing agent, and an imidazole catalyst.

The curing temperature of the composition disclosed in JP10226745 includes heating the composition at a temperature of 80° C. for 2 hours followed by further curing the composition at a temperature of 120° C. for 2 hours. The composition of JP10226745 includes a liquid cyclo-epoxy resins (A) (at 10° C. to 35° C. the epoxy resin is liquid); cyclohexane dimethanol diglycidyl ether (B) (<100 mPa-s at 25° C.); anhydride curing agents (C); catalyst solution, 50 wt % solid, (D); and with or without reactive epoxy diluents with viscosity less than 30 mPa-s at 25° C. Neither JP08012741 nor JP10226745 disclose a curing temperature being at ambient temperature (about 25° C.).

What is needed in the coating industry is a low viscosity, solvent-free epoxy resin composition containing a blend of epoxy resins that when formulated into a curable composition cures rapidly; and such that when cured, the resulting cured coating exhibits improved performance properties such as good resistance to moisture and corrosion. In addition, there is a need in the coating industry for easy to apply chemical resistant coatings with good flexibility and good impact resistance.

SUMMARY

One aspect of the present invention is directed to a curable coating composition including:

(a) a blend of at least two or more epoxy resins, wherein at least one of the epoxy resins comprises (i) a CHDM epoxy resin (10 weight percent [wt %] to 95 wt %) having less than (<) 2 wt % chlorine (Cl) content; and (ii) at least one other epoxy resin other than the epoxy resin in component (i) (5 wt % to 90 wt %); and (b) at least one amine curing agent.

In another embodiment, the blend of at least two or more epoxy resins can include a CHDM epoxy resin component (i) having <10 wt % CHDM monoglycidyl ether or <30 wt % oligomeric epoxy resin.

Another aspect of the present invention is directed to curing the above curable coating composition to form a cured thermoset coating product.

The blends of epoxy resins of the present invention surprisingly give low viscosity compositions that, when formulated into a curable composition, cure rapidly. By rapid cure with reference to a curable composition, it is meant that an epoxy resin composition with low Cl content gives faster cure than an epoxy resin composition with high Cl level as shown in the Examples (e.g., see Example 1 and Comparative Example A) herein described below. In general, curing can be dependent on the type of hardener used in the curable composition but rapid curing is typically less than about 24 hours.

The cured coatings produced from the above curable composition advantageously exhibit superb resistance to moisture and corrosion. For example, in one embodiment, 1,4-cyclohexanedimethanol epoxy resin (CHDM epoxy resin) may be blended with one or more conventional epoxy resins to provide a low viscosity composition for formulating into a curable composition. The 1,4-cyclohexanedimethanol epoxy resin (CHDM epoxy resin) may include a mixture of 1,4-cyclohexanedimethanol diglycidylether (CHDM DGE) with other compounds such as impurities present in the mixture. For example, the CHDM epoxy resin used in the curable composition of the present invention has an average functionality >1 and the resin advantageously does not depress Tg of the final coating into an unusable Tg range.

Some of the advantages of the present invention include for example, forming a coating formulation with a lower viscosity, forming a coating formulation that can be used for low VOC tank lining coating formulations or for marine and maintenance coating applications, and improving the properties of the coating such as coating flexibility and impact resistance.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

Figure 1:
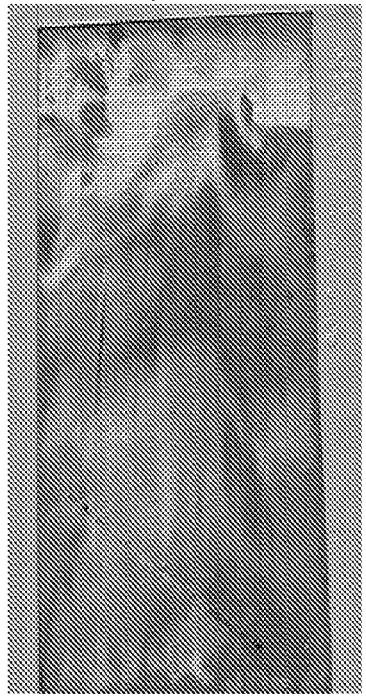
FIG. 1 is a series of photographs of several coating film samples showing coatings of the present invention (coatings derived from CHDM epoxy resin containing low levels of Cl) compared against coating samples not of the present invention (coatings derived from CHDM epoxy resin containing high levels of Cl); wherein the coatings were evaluated after being placed in a humidity cabinet for 1000 hours. The samples were monitored over time. The coatings derived from CHDM epoxy resin containing high levels of Cl whitened while the coatings derived from the coating composition of the present invention (CHDM epoxy resin with low Cl) did not.
Figure 1:
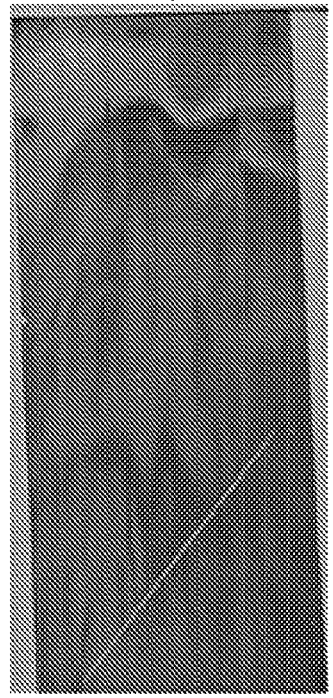
Figure 1:
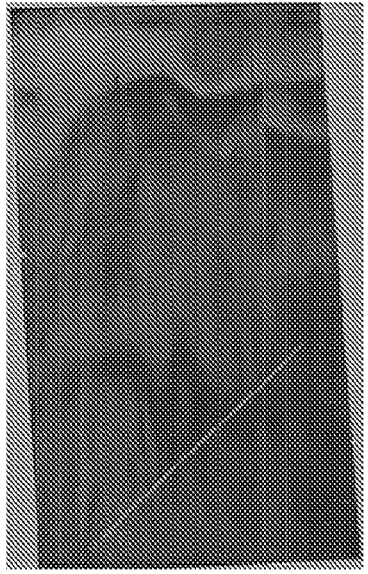
Figure 1:
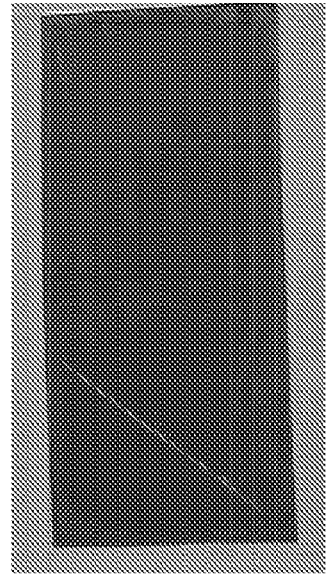

"High solids" with reference to a coating composition herein means a coating formulation with about 70 wt % or higher solids. Ideally, the coating composition of the present invention should contain a maximum solids content of 100 wt % or as close as possible to a solids content of 100 wt %. Generally, the coating composition of the present invention contains for example greater than about 70 wt % in one embodiment; greater than about 75 wt % in another embodiment; greater than about 85 wt % in still another embodiment; and greater than about 95 wt % in yet another embodiment.

"Whitened" or "whitening" with reference to a coating film herein means a white film or haze that has bloomed to the surface of the coating film creating a discoloration from the initial state.

"Blistered" or "blistering" with reference to a coating film herein means that the coating has lost adhesion to the substrate in specific small domains.

"Solvent-free" or "free of solvent" or "solventless" with reference to a coating composition herein means essentially free of added volatile material in the coating formulation, i.e., no solvent is intentionally added to the coating composition of the present invention and the amount of solvent present in the coating composition is essentially zero. However, some amount of solvent may be present in the coating composition as a consequence of preparing the composition; and therefore, less than 5 wt % of volatile material may be present in the composition.

In a broad scope, the present invention includes a low viscosity curable epoxy resin composition useful in coating applications and having improved properties such as reduced volatile organic compounds (VOCs), reduced whitening, reduced blistering, increased water resistance, increased chemical resistance, increased corrosion resistance, increased flexibility, and increased impact resistance.

Component (a) of the curable coating composition of the present invention includes a blend of two or more epoxy compounds. The present invention includes low viscosity blends of at least two epoxy resin compounds such as for example a liquid epoxy resin or an epoxy novolac resin blended with a cyclohexanedimethanol (CHDM) epoxy resin.

In one embodiment for example, the first epoxy compound, component (i) of the blend of epoxies, can be at least one epoxy resin comprising a CHDM epoxy resin; wherein the CHDM epoxy resin may include (among other oligomers and monomers), for example, 1,4-cyclohexanedimethanol diglycidyl ether (CHDM DGE) having the following chemical structure, Structure (I):

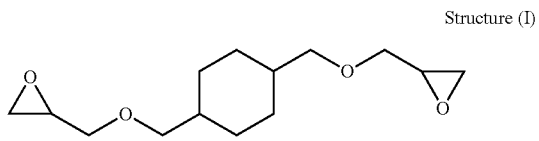 [SMILES: C1CC(COCC2CO2)CCC1COCC1CO1]

Structure (I)

CHDM DGE shown in Structure (I) above is one of the main components in the CHDM epoxy resin. The CHDM epoxy resin used in the present invention can also contain others species such as higher molecular weight oligomers and monoglycidyl ether components. The CHDM portion in the CHDM epoxy resin may consist of both cis- and trans-isomers.

Formulated compositions with the blends of epoxy resins enable application of the compositions to substrates with reduced or no solvent; and provide coatings prepared from such compositions that possess good flexibility and good impact resistance while maintaining good chemical resistance.

The CHDM epoxy resin useful in the present invention advantageously has several beneficial characteristics including for example, a low total chlorine content, a low CHDM monoglycidyl ether content; and a low oligomeric epoxy resin content.

For example, the total chlorine content of the CHDM epoxy resin used in preparing the blended epoxy resin, component (a), of the present invention generally can be less than about 2 wt % in one embodiment, from about 0.01 wt % to about 1 wt % in another embodiment, from about 0.01 wt % to about 0.5 wt % in still another embodiment, from about 0.01 wt % to about 0.25 wt % in yet another embodiment, and from about 0.01 wt % to about 0.1 wt % in even still another embodiment, based on the weight of the total components in the epoxy resin. A lower concentration of chlorine in the epoxy resin is more advantageous in forming the curable coating composition of the present invention. An epoxy resin containing a Cl concentration of greater than 2 wt %, when used in preparing a curable coating composition, can result in a coating film showing signs of blistering and whitening when such curable coating composition having high levels of Cl is used in producing a cured coating film.

The concentration of the CHDM monoglycidyl ether content present in the CHDM epoxy resin used in preparing the blended epoxy resin, component (a), of the present invention generally can be less than 10 wt % in one embodiment, from about 0.01 wt % to about 10 wt % in another embodiment, from about 0.1 wt % to about 8 wt % in still another embodiment, from about 0.5 wt % to about 6 wt % in yet another embodiment, and from about 1 wt % to about 5 wt % in even still another embodiment, based on the weight of the total components in the epoxy resin. A higher concentration of above 10 wt % of the CHDM monoglycidyl ether present in the epoxy resin reduces the capability of the curable coating composition having such epoxy resin to crosslink; and the presence of high levels of CHDM monoglycidyl ether lowers the crosslink density and chemical resistance properties of the curable coating composition.

The concentration of the oligomeric epoxy resin content present in the CHDM epoxy resin used in preparing the blended epoxy resin composition of the present invention generally can be less than 30 wt % in one embodiment, from about 0.01 wt % to about 30 wt % in another embodiment, from about 1 wt % to about 25 wt % in still another embodiment, from about 2 wt % to about 20 wt % in yet another embodiment, and from about 5 wt % to about 15 wt % in even still another embodiment, based on the weight of the total components in the epoxy resin. At high levels of oligomers above 30 wt % present in the epoxy resin, the viscosity of the formulation made from such epoxy resin is higher. At lower levels of oligomers below 0.01 wt % present in the epoxy resin, the functionality of the curable coating composition having such epoxy resin is reduced, which in turn, reduces the crosslink density of the resultant coatings derived from the curable coating composition.

The epoxide equivalent weight (EEW) of the CHDM epoxy resin used in preparing the blended epoxy resin of the present invention can range for example from a lower limit of about 128 to an upper limit of about 160 in one embodiment, specifically an upper limit less than or equal to about 155 in another embodiment, more specifically an upper limit less than or equal to about 150 in still another embodiment, still more specifically an upper limit less than or equal to about 145 in yet another embodiment, even more specifically an upper limit less than or equal to about 140 in even still another embodiment, yet more specifically an upper limit less than or equal to about 135 in even yet another embodiment, and even yet more specifically an upper limit less than or equal to about 130 in even yet one other embodiment.

Other CHDM epoxy resins useful in the curable coating composition of the present invention can include for example UNOXOL epoxy resin (which is a mixture of 1,3- and 1,4-CHDM epoxy resin); other cycloaliphatic epoxy resins; and mixtures thereof.

Component (a) of the curable coating composition of the present invention which includes a blend of two or more epoxy compounds may include (ii) at least one other epoxy resin (second epoxy compound) other than the epoxy resin in component (i) (first epoxy compound) to form the blend of epoxy compounds. For example, the second epoxy compound useful in the present invention may include any conventional epoxy compound known to the skilled artisan.

For example, one embodiment of the second epoxy compound used in the blend of epoxy compounds of the present invention may be for example a single epoxy compound used alone; or a combination of two or more other epoxy compounds known in the art such as any of the epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the second epoxy compound may include for example epoxy resins based on the reaction product of: (1) a polyfunctional compound of an alcohol, a phenol, a cycloaliphatic carboxylic acid, an aromatic amine, or an aminophenol; and (2) an epihalohydrin such as for example an epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and phenol novolacs. The second epoxy compound may also be selected from commercially available epoxy resin products such as for example, D.E.R. 331®, D.E.R. 332, D.E.R. 337, D.E.R. 354, D.E.N. 425, D.E.N. 431, D.E.N. 438, D.E.R. 671, D.E.R. 664, D.E.R.

736, or D.E.R. 732, epoxy resins available from The Dow Chemical Company. (D.E.R. is a trademark of The Dow Chemical Company.)

Preferred embodiments of the second epoxy resin compound useful in the present invention may include for example one or more liquid epoxy resins such as for example a liquid epoxy resin (LER) such as a liquid bisphenol A (BPA) based epoxy resin, an advanced bisphenol A based epoxy resin, a fatty acid modified epoxy resin, a dimer acid advanced epoxy resin, a cardanol modified epoxy resin, a cardol advanced epoxy resin, a liquid epoxy resin based on bisphenol F (BPF), epoxy novolac resins, epoxy cresol novolac resins, resorcinol epoxy resins, other aromatic epoxy resins, and rubber modified epoxy resins, and mixtures thereof.

The epoxide equivalent weight (EEW) of the second epoxy resin compound may be less than about 1000 in one embodiment, from about 100 to about 1000 in another embodiment, and from about 150 to about 800 in still another embodiment.

Generally, the amount of the first epoxy compound used to prepare the blend of epoxy compounds, component (a) of the present invention, may be for example, wherein the first epoxy compound ranges from about 10 wt % to about 95 wt % in one embodiment, from about 10 wt % to about 90 wt % in another embodiment, from about 20 wt % to about 80 wt % in still another embodiment; and from about 30 wt % to about 70 wt % in yet another embodiment, based on the total weight of the composition of the blended epoxy compound. At lower levels of first epoxy compound below 10 wt %, the viscosity of the formulation is disadvantageously high. At higher levels of first epoxy compound up to 95 wt %, a different balance of properties is exhibited by the composition wherein the glass transition temperature is depressed and weatherability is enhanced.

Generally, the amount of the second epoxy compound used to prepare the blend of epoxy compounds, component (a) of the present invention, may be for example, wherein the second epoxy compound ranges from about 10 wt % to about 90 wt % in one embodiment, from about 20 wt % to about 80 wt % in another embodiment; and from about 30 wt % to about 70 wt % in still another embodiment, based on the total weight of the composition of the blended epoxy compound.

As an illustration of the present invention, the blend of first and second epoxy resins may include for example a CHDM epoxy resin as the first epoxy resin at a content of 40 weight %; and for example liquid epoxy resin (DER 331) as the second epoxy resin at a content of 60 weight %.

As another illustration of the present invention, the blend of first and second epoxy resins may include for example a CHDM epoxy resin as the first epoxy resin at a content of from about 10 wt % to about 25 wt % of CHDM epoxy resin and for example a novolac epoxy resin such as D.E.N. 438 as the second epoxy resin at a content of from about 75 wt % to about 90 wt % of D.E.N. 438.

The low viscosity novolac epoxy resin composition of the present invention exhibits improved flexibility and impact resistance wherein the composition is useful, for example, for tank lining coating formulations. Blending about 10 wt % to about 25 wt % of CHDM epoxy resin in D.E.N. 438 significantly reduces the viscosity of the novolac epoxy resin composition, but maintains chemical resistance and improves flexibility and impact resistance of the cured novolac epoxy resin coating. At higher blend ratios of CHDM epoxy resin, chemical resistance is sacrificed. At lower levels of CHDM epoxy resin, viscosity reduction is reduced. The blend ratio can be preferably in the range of from about 15 wt % to about 20 wt % CHDM epoxy resin.

For example, optional compounds that may be added to the blend of first and second epoxy compounds of the present invention may include accelerators such as for example, benzyl alcohol, salicylic acid, and tris-2,4,6-dimethylaminomethyl phenol; fillers including for example finely divided minerals such as silica, alumina, zirconia, talc, sulfates, $TiO_2$, carbon black, graphite, silicates and the like; metals such as zinc and aluminum; other epoxy resins; catalysts; solvents; reinforcing agents; rheology modifiers; surfactants; UV stabilizers; antioxidants; wetting agents; colorants including pigments, dyes, and tints; and mixtures thereof.

Generally, the amount of optional compounds or additives used in the blend of epoxy compounds of the present invention, may be for example, from 0 wt % to about 90 wt % in one embodiment, from about 0.01 wt % to about 80 wt % in another embodiment; and from about 5 wt % to about 75 wt % in still another embodiment, based on the total weight of the composition of the blended epoxy compound. Depending on the desired application enduse of the present invention composition, various optional compounds may be used in different concentrations toward the end points of the above ranges. For example, a wetting agent can be generally used below 1 wt %; and for example a pigment or a metal such as zinc can be generally used up to 90 wt %. One skilled in the art will be able to adjust the concentrations of the optional compounds depending on the intended use of such optional compounds.

The process for preparing the blended epoxy compound of the present invention includes admixing (i) at least one first epoxy compound such as CHDM epoxy resin; and (ii) at least one second epoxy resin that is different from the first epoxy compound component (i). Other optional ingredients useful for preparing the blended epoxy compound can be added to the above mixture or formulation as needed. In one embodiment, the preparation of the blended epoxy compound of the present invention is achieved by blending, in known mixing equipment, the first epoxy compound, the second epoxy compound, and optionally any other desirable additives. Any of the above-mentioned compounds may be added to the formulation used to make the blended epoxy compound in any mixing order.

All the compounds of the blended epoxy compound composition are typically mixed and dispersed at a temperature enabling the preparation of an effective blend composition for a coating composition. For example, the temperature during the mixing of all components used in making the blended epoxy compound may be generally from about 10° C. to about 130° C. in one embodiment, and from about 20° C. to about 100° C. in another embodiment. In one embodiment, advantageously, the conditions above can be modified as desired such that the blended epoxy compound can be made without adversely affecting the final product upon heating.

The preparation of the blended epoxy compound of the present invention, and/or any of the steps thereof, may be a batch or a continuous process. The mixing equipment used in the process may be any vessel and ancillary equipment well known to those skilled in the art.

The blended epoxy resin compound, before use in a curable composition, advantageously has several improved properties. For example, the blended liquid epoxy resin has viscosity of less than about 20 Pa-s at room temperature (about 25° C.) in one embodiment, from about 0.01 Pa-s to about 15 Pa-s in another embodiment, from about 0.02 Pa-s to about 10 Pa-s in another embodiment, from about 0.03 Pa-s to about 5 Pa-s in another embodiment, from about 0.04 Pa-s to about 2.5 Pa-s in yet another embodiment, and from about 0.05 Pa-s to about 1 Pa-s in still another embodiment.

One embodiment of the present invention is directed to providing a curable coating resin formulation or composition including (a) the blended epoxy resin compound described above (which can be referred to as "Part A" of a two part system); and (b) at least one amine curing agent (which can be referred to as "Part B" of a two part system). Other optional additives known to the skilled artisan can be included in the curable composition such as for example a curing catalyst and other additives that do not adversely affect the final coating product made from the composition.

The blended epoxy resin compound useful as component (a) in preparing a curable coating composition of the present invention may include, for example, the blended epoxy resin compound described above.

In general, the at least one amine curing agent, component (b) [also referred to as a hardener or cross-linking agent], which is blended with the epoxy resin compound, component (a), to prepare the curable composition of the present invention may comprise, for example, any conventional amine curing agent known in the art useful for including in a curable composition. For example, the amine curing agent, useful in the curable composition, may be selected, for example, but are not limited to, primary amine compounds, secondary amine compounds, tertiary amine compounds, and mixtures thereof.

For example, in one embodiment, the curable composition of the present invention may include at least one amine compound as component (b) comprising an ethylene amine, a cycloaliphatic amine, a Mannich base, and mixtures thereof.

Another preferred embodiment of the amine compound useful in the present invention may include an amidoamine, a polyamide, a phenalkamine, and mixtures thereof.

Other hardeners that can be used in the present invention composition may include for example hardeners based on isophorone diamine, bisaminomethylcyclohexane, bis(aminocyclohexyl)methane, metaxylene diamine, diaminocyclohexane, and ethyleneamines; adducts of any one or more of the aforementioned amines with epoxy resins; amides of any one or more of the aforementioned amines with fatty acids and dimer acids; Mannich bases of any one or more of the aforementioned amines; and mixtures thereof.

The concentration of the amine compound present in the curable epoxy resin composition of the present invention may range generally in an equivalent ratio of amine NH:epoxy functionality of from about 0.5:1 to about 1.5:1 in one embodiment, from about 0.6:1 to about 1.4:1 in another embodiment, from about 0.7:1 to about 1.3:1 in still another embodiment, from about 0.8:1 to about 1.2:1 in yet another embodiment, and from about 0.8:1 to about 1.1:1 in even still another embodiment. Outside the above concentrations, the resulting coating film properties may suffer due to poor network formation from a stoichiometric imbalance.

As an illustration of one embodiment, the curable composition of the present invention can include one or more of the hardeners described above, and in preparing the curable composition, the following two parts: Parts A and Part B can be used:

Part A or the epoxy side of the composition can include from about 75 wt % to about 90 wt % of epoxy novolac and from about 10 wt % to about 25 wt % of a cycloaliphatic epoxy resin.

Part B or the hardener side of the composition can include an amine hardener in the range of from about 0.5 to about 1.5 molar ratio of N—H/epoxy, and preferably from about 0.7 to about 1.3 molar ratio of N—H/epoxy.

In preparing the curable resin composition of the present invention, optional compounds can be added to the curable composition including for example compounds that are normally used in resin formulations known to those skilled in the art for preparing curable compositions and thermosets. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

Other optional compounds that may be added to the curable composition of the present invention may include, for example, a catalyst to facilitate the reaction between the epoxy compound and the curing agent used, a solvent to lower the viscosity of the formulation further, other resins such as a phenolic resin that can be blended with the first and second epoxy resins of the formulation, other epoxy resins different from the first and second epoxy compounds of the present invention (for example, aromatic and aliphatic glycidyl ethers; cycloaliphatic epoxy resins; and divinylarene dioxides such as divinylbenzene dioxide), other curing agents, accelerators, fillers, pigments, toughening agents, flow modifiers, adhesion promoters, diluents, stabilizers, plasticizers, catalyst de-activators, flame retardants, wetting agents, rheology modifiers, other similar additives/components used in epoxy coatings, and mixtures thereof.

Examples of optional other curing agents different from the amine curing agent useful in the present invention may include any of the co-reactive or catalytic curing materials known to be useful for curing epoxy resin based compositions. Such co-reactive curing agents include, for example, polyamine, polyamide, polyaminoamide, dicyandiamide, polymeric thiol, polycarboxylic acid and anhydride, and any combination thereof or the like. Suitable catalytic curing agents include tertiary amines; quaternary ammonium halides; quaternary phosphonium halides or carboxylates; Lewis acids such as boron trifluoride; and any combination thereof or the like. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and phenolics are preferred.

Generally, the amount of one or more optional components, when used in the present invention, may be for example, from 0 wt % to about 90 wt % in one embodiment, from about 0.01 wt % to about 80 wt % in another embodiment; from about 0.1 wt % to about 80 wt % in still another embodiment; and from about 5 wt % to about 75 wt % in yet another embodiment.

The process for preparing the curable composition of the present invention includes admixing (a) the blended epoxy resin compound described above; (b) at least one amine curing agent; and (c) optionally, any other optional compound such as at least one cure catalyst or other optional ingredients described above as needed. For example, the preparation of the curable resin formulation of the present invention is achieved by blending, in known mixing equipment, the blended epoxy resin compound, the curing agent, and optionally any other desirable additives. Any of the above-mentioned optional additives, for example a curing catalyst, may be added to the composition during the mixing or prior to the mixing to form the composition.

All the compounds of the curable formulation are typically mixed and dispersed at a temperature enabling the preparation of an effective curable epoxy resin composition having the desired balance of properties for a particular application, particularly the coating application described herein. For example, the temperature during the mixing of all components may be generally from about 0° C. to about 80° C. in one embodiment, and from about 10° C. to about 50° C. in another embodiment. Lower mixing temperatures help to minimize reaction of the epoxide and hardener in the composition to maximize the pot life of the composition.

The preparation of the curable formulation of the present invention, and/or any of the steps thereof, may be a batch or a continuous process. The mixing equipment used in the process may be any vessel and ancillary equipment well known to those skilled in the art.

The curable composition of the present invention advantageously exhibits improved properties such as low viscosity and rapid dry time.

For example, the viscosity of the curable composition of the present invention can be less than about 20 Pa-s at room temperature (about 25° C.) in one embodiment, from about 0.01 Pa-s to about 15 Pa-s in another embodiment, from about 0.02 Pa-s to about 10 Pa-s in another embodiment, from about 0.03 Pa-s to about 5 Pa-s in another embodiment, from about 0.04 Pa-s to about 2.5 Pa-s in yet another embodiment, and from about 0.05 Pa-s to about 1 Pa-s in still another embodiment.

The process of the present invention includes curing the curable resin composition to form a thermoset or cured composition such as a film coating on a substrate. The process of curing of the curable composition may be carried out at a predetermined temperature and for a predetermined period of time sufficient to cure the composition. The curing process may be dependent on the hardeners used in the formulation. For example, the temperature of curing the formulation may be generally from about −10° C. to about 200° C. in one embodiment; from about 0° C. to about 100° C. in another embodiment; and from about 5° C. to about 75° C. in still another embodiment.

Generally, the dry through time may be chosen between about 1 hour to about 48 hours in one embodiment, between about 2 hours to about 24 hours in another embodiment, and between about 4 hours to about 12 hours in still another embodiment. Below a period of time of about 1 hour, the time may be too short to ensure sufficient time for mixing and application under conventional processing conditions; and above about 48 hours, the time may be too long to be practical or economical.

The cured product (i.e. the cross-linked product made from the curable composition) of the present invention shows several improved properties over conventional epoxy cured resins. For example, the cured coating product of the present invention may advantageously exhibit reduced whitening, reduced blistering, increased moisture resistance, increased corrosion resistance and increased rust protection.

In one embodiment, the cured coating product of the present invention advantageously does not have a tendency to whiten. The whitening property of the cured coating product can be measured by spectrocolorimetry according to C.I.E. Lab environment (L, a, b system). In accordance with the whitening measurement method, delta (Δ) a, ΔL (whitening), Δb (yellowing) and ΔE (change of colors) are measured.

For example, the whitening measurements can be carried out by spectrocolorimetry and evaluated according the following scale:

$$\Delta L = L_{sample} - L_{standard}$$

+ΔL means sample is lighter than standard
−ΔL means sample is lighter than standard $$\Delta a = a_{sample} - a_{standard}$$

+Δa means sample is redder than standard
−Δa means sample is greener than standard $$\Delta b = b_{sample} - b_{standard}$$

+Δb means sample is yellower than standard
−Δb means sample is bluer than standard $$\Delta E = \sqrt{\Delta L^2 + \Delta a^2 + \Delta b^2}$$

Generally, for example, the whitening property of the cured coating product of the present invention advantageously is represented on a numerical scale in the C.I.E. lab system from 0 to 100 (0 is black and 100 is white). Typically, the whitening is given by the ΔE value which represents the difference between the value obtained for the coating before and after exposure. A ΔE value ≥2 is already an indication of poor performance. Zero is the best performance which can be achieved. Values of 0.1≥ΔE≤2 are acceptable values of whitening for coatings.

In another embodiment, the cured coating product of the present invention advantageously does not have a tendency to blister. The blistering property of the cured coating product can be measured and evaluated using the visual scale described in ASTM D714 or ISO 4628-2.

Generally, for example, the blistering property of the cured coating product of the present invention advantageously is rated less than F8 (F=few for the blisters density and 8 is the minimal visible size of the blister). In the present invention, anything above F8 is not acceptable.

Also, the cured coating product of the present invention may advantageously exhibit strong moisture resistance and corrosion resistance properties. In general, the coating corrosion and water resistance can be the number of hours that the coated panel must pass a particular test without blistering and rusting.

For example, the moisture resistance can be measured and determined by a water condensation (Cleveland cabinet) test which method is described in ASTM D2247-99 or ISO 6270-1. In one embodiment, water resistance of the coating can be measured and determined by the number of hours passed by a coated panel. The longer the time period a coated panel passes the moisture resistance test; the more moisture resistant the coated panel. The moisture resistance measured by the above method should advantageously be as long as possible. For example, the time period can be greater than about 500 hours in one embodiment, greater than about 1,000 hours in another embodiment, greater than about 1,500 hours in still another embodiment, and greater than 10,000 hours in yet another embodiment.

The corrosion resistance of a coating can be measured, for example, using the neutral Salt Spray Test as described in ASTM B117 or ISO 9227. In one embodiment, corrosion resistance of the coating can be measured and determined by the number of hours passed by a coated panel. The longer the time period a coated panel passes the corrosion resistance test; the more corrosion resistant the coated panel. The corrosion resistance measured by the above method should advantageously be as long as possible. For example, the time period can be greater than about 500 hours in one embodiment, greater than about 1,000 hours in another embodiment, greater than about 1,500 hours in still another embodiment, and greater than 10,000 hours in yet another embodiment.

Increased rust protection is evaluated according to the method described in ASTM D-1654 or ISO 4628-3. Generally, for example, the rust levels on the coated substrate which has been coated with the coating of the present invention are advantageously rated as Ri2 (ISO scale or 7 with ASTM scale) as shown in the following table which shows the approximate correlation between the ISO rating system and the ASTM rust scale:

| ISO Scale | ASTM Rust Scale (ASTM D 610) |
|---|---|
| Ri0 | 10 |
| Ri1 | 9 |
| Ri2 | 7 |
| Ri3 | 6 |
| Ri4 | 4 |
| Ri5 | 1 to 2 |

In the present invention, anything above Ri2 is not acceptable.

While not to be limited to any particular theory or hypothesis, it is believed that the improved performance of the cured coatings of the present invention is partly due to compositional differences between a CHDM epoxy resin used in the present invention curable composition and other commercially available epoxy resin products known by the same name. In particular, it is believed that the improved performance of the cured coatings of the present invention is also partly due to low levels of Cl in the CHDM epoxy resin used in the present invention curable composition; and the higher average epoxy functionality (lower monoglycidyl ether and higher polyfunctional oligomer) in the present invention curable composition. Therefore, the cured coating prepared from the present invention curable composition exhibits fewer defects in the crosslinked polymer network.

Again, not to be limited to any particular theory or hypothesis, it is believed that the species present in the CHDM epoxy resin used in a curable composition and the distribution of such species for example Cl levels is a function of the process used to produce the CHDM epoxy resin. Previous versions of CHDM epoxy resin are made by a route utilizing Lewis acid catalysis in a first step which promotes coupling of aliphatic alcohol (CHDM) with epichlorohydrin but also results in oligomerization of epichlorohydrin onto the alcohol which ultimately yields high levels of Cl in the final product. The CHDM epoxy resin defined in the present invention can be made by routes utilizing a base to promote coupling of aliphatic alcohol (CHDM) with epichlorohydrin. The base promoted coupling process yields products with low levels of Cl.

The curable composition of the present invention may be used to manufacture a cured thermoset product that may be used in various coating applications. For example, the curable composition may be used in coating applications used in marine and maintenance coating applications. The curable coating composition and cured coating can also be used in tank lining applications.

EXAMPLES

The following examples and comparative examples further illustrate the present invention in detail but are not to be construed to limit the scope thereof.

Various terms and designations used in the following examples are explained herein below:

"CHDM DGE" stands for 1,4-cyclohexanedimethanol diglycidyl ether.

"CHDM" stands for 1,4-cyclohexanedimethanol.

"EEW" stands for epoxide equivalent weight.

OudraCure LC 5512 is an amine curing agent commercially available from The Dow Chemical Company.

Erisys GE 22 is a CHDM epoxy resin commercially available from CVC Specialty Thermosets.

Bentone SD2 is an organically modified clay commercially available from Elementis.

Ti-Pure R706 is a titanium dioxide commercially available from DuPont.

Imsil 1240 is a silica filler commercially available from Unimin Corporation.

Cimbar UF is barium sulfate commercially available from Cimbar Performance Minerals.

D.E.R. 337 is an epoxy resin having an EEW of 240 and commercially available from The Dow Chemical Company.

"PVC" stands for pigment volume concentration and said concentration is given in %.

Araldite DY-C is a CHDM epoxy resin commercially available from Huntsman.

Polypox R11 is a CHDM epoxy resin commercially available from The Dow Chemical Company.

CHDM Epoxy Resin is an epoxy resin available from The Dow Chemical Company.

CHDM DGE is an epoxy resin available from The Dow Chemical Company.

D.E.N. 438 is a novolac resin commercially available from The Dow Chemical Company.

GNS GS-530 is a hardener commercially available from GNS Technologies.

Xylene is a solvent commercially available from Fisher Scientific.

Example 1 and Comparative Example A

In these examples, the dry speed of formulations based on a CHDM epoxy resin having a low concentration of Cl (Example 1) and a CHDM epoxy resin having a high concentration of Cl (Comparative Example A) were evaluated. The coating formulations were prepared by mixing a curing agent (OudraCure LC 5512) with an indicated pigmented epoxy resin at a 1:1 epoxy:NH stoichiometric ratio. Erisys GE 22 used in Comparative Example A contains 5.52 wt % Cl as measured by neutron activation while the CHDM epoxy resin of the present invention used in Example 1 contains <0.1% Cl. Pigmented CHDM epoxy is a formulation consisting of 50.94 wt % CHDM epoxy resin (or Erisys GE 22), 0.76 wt % Bentone SD2, 14 wt % Ti-Pure R706, 26.7 wt % Imsil 1240, and 7.6 wt % Cimbar UF.

The coatings were then drawn down onto glass substrates with a wet film thickness of 76 μm and drying evaluated on a BYK drying time recorder. The set-to-touch, tack-free, and dry-through times were measured by dragging a needle through the coating using a BYK drying time recorder according to the procedure described in ASTM D5895-03. Table 1 reveals that the CHDM epoxy resin of the present invention containing low levels of chlorine dry faster than the resin containing high levels of chlorine. The measurements in Table 1 were carried out at ambient conditions such as for example at a temperature of about 23° C. and a relative humidity of about 63%.

TABLE 1

| Example | Set-to-Touch (hrs) | Tack Free (hrs) | Dry Through (hrs) |
|---|---|---|---|
| Example 1 | 6 | 9 | 14 |
| Comparative Example A | 9 | 12 | >24 |

Example 2 and Comparative Examples B-D—Moisture Resistance

Blends of D.E.R. 337 (65 wt %) and CHDM epoxy resins (35 wt %) were formulated into a 22 PVC red primer formulation. Comparative Example B utilized Erisys GE 22 with a total Cl level of 5.52 wt % by neutron activation; Comparative Example C utilized Araldite DY-C with a total Cl level of 4.0 wt % as measured by neutron activation; Comparative Example D utilized Polypox R11 with a total Cl level of 4.2 wt %; and Example 2 utilized CHDM epoxy resin with a total Cl level of <0.1 wt % by neutron activation. The curing agent utilized was OudraCure LC 5512 at an amine NH to epoxy stoichiometric ratio of 0.8:1.

Coatings were applied to a panel substrate to achieve a dry film thickness of 100 microns. After drying the coated panels for 1 week at ambient temperature, the coatings were scribed and placed in a humidity cabinet. The coated panel samples were monitored over time. The coatings derived from CHDM epoxy resin containing high levels of Cl whitened while the coating of the present invention (Example 2) derived from CHDM epoxy resin with low Cl did not. This difference in whitening is illustrated from the visual observation of the coated panels shown in the pictures of FIG. 1 after subjecting the panels to 1,000 hours in the humidity cabinet; and the results of the whitening measurements are described in Table 2. The reference panel was evaluated before testing (no whitening or color deviation), and the measurements are for the white panel.

TABLE 2

| Panel | L | a | b | ΔL | Δb | ΔE |
|---|---|---|---|---|---|---|
| Reference | 38.00 | 25.33 | 15.97 | — | — | — |
| Example C | 59.25 | 17.09 | 11.01 | 8.34 | −0.41 | 8.42 |
| Example B | 49.15 | 22.72 | 14.72 | 6.34 | −0.26 | 6.44 |
| Example D | 41.29 | 23.99 | 14.83 | 3.33 | −1.30 | 3.73 |
| Example 2 | 37.90 | 25.01 | 15.65 | −0.06 | −0.28 | 0.40 |

Generally, the requirements in term of color change after an accelerated test (like QUV testing or humidity chamber), the coating on coated panels that undergoes a change in ΔE or ΔL up to 1 or 2 units can be a significant change.

Example 3 and Comparative Examples E-G—Corrosion Resistance

Blends of D.E.R. 331 (65 wt %) and CHDM epoxy resins (35 wt %) were formulated into a 22 PVC (pigment volume concentration) red primer formulation. Comparative Example E utilized Araldite DY-C with a total Cl level of 4.0 wt % by neutron activation; Comparative Example F utilized Erisys GE 22 with a total Cl level of 5.52 wt % by neutron activation; Comparative Example G utilized Polypox R11 with a total Cl level of 4.2 wt %; and Example 3 utilized CHDM epoxy resin with a total Cl level of <0.1 wt % as measured by neutron activation. The curing agent was OudraCure LC 5512 at an amine NH to epoxy stoichiometric ratio of 0.8:1.

Figure 2:
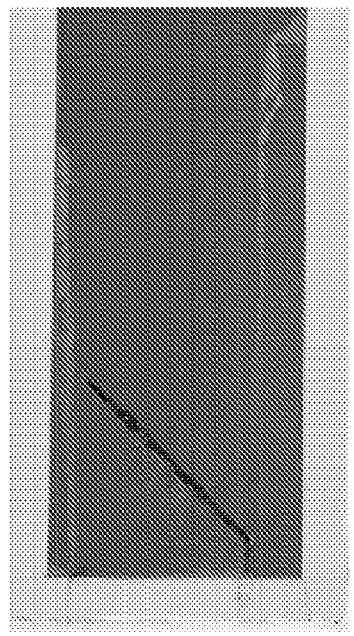
FIG. 2 is a series of photographs of several coating film samples showing coatings of the present invention (coatings derived from CHDM epoxy resin containing low levels of Cl) compared against coating samples not of the present invention (coatings derived from CHDM epoxy resin containing high levels of Cl); wherein the coatings were evaluated after the coatings were dried for 1 week at ambient temperature, scribed, and placed in a salt fog chamber for 500 hours. The samples were monitored over time. The coatings derived from CHDM epoxy resin containing high levels of Cl blistered while the coatings derived from the coating composition of the present invention (CHDM epoxy resin with low Cl) did not.
Figure 2:
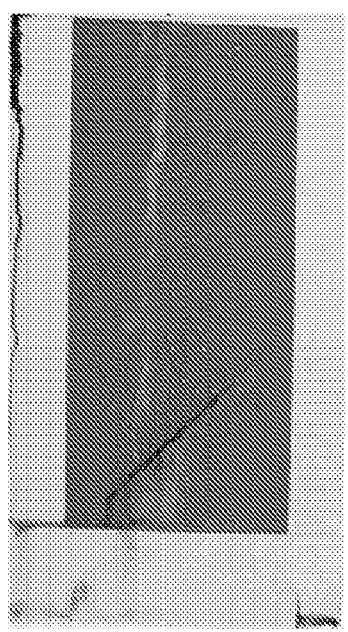
Figure 2:
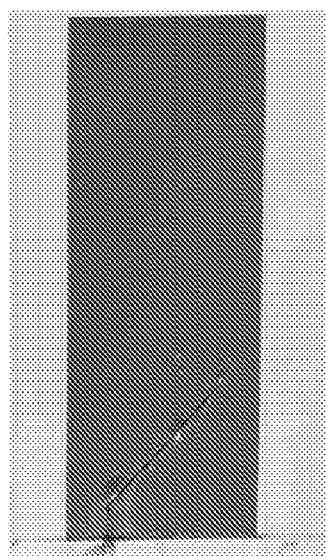
Figure 2:
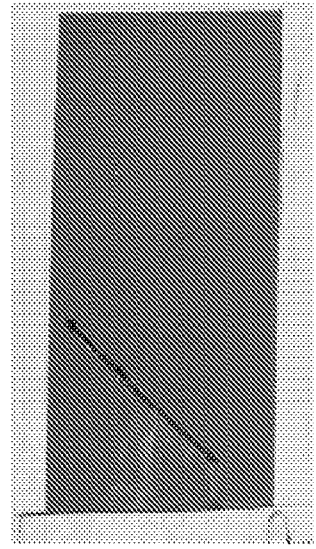

Coatings were applied to a panel substrate to achieve a dry film thickness of 100 microns. After drying the coated panels for 1 week at ambient temperature, the coatings were scribed and placed in a salt fog chamber. The coated panel samples were monitored over time. The coatings derived from CHDM epoxy resin containing high levels of Cl blistered while the coatings of the present invention (Example 3) derived from CHDM epoxy resin with low Cl did not. This difference in blistering is illustrated from the visual observation of the coated panels shown in the pictures of FIG. 2 after subjecting the panels to 500 hours of salt fog. The results of the corrosion measurements are described in Table 3 and the scale for the rust evaluation is shown in Table 4.

TABLE 3

| Example | Blister Evaluation according to ASTM D714 | Rust evaluation according to ASTM D610 |
|---|---|---|
| Example E | F6 | 5G |
| Example F | MD6 | 3G |
| Example G | F8 and F2 around the scribe | 6G |
| Example 3 | None | 9G (around the scribe only) |

TABLE 4

Visual Examples

| Rust Grade | Percent of Surface Rusted | Spot (S) | General (G) | Pinpoint (P) |
|---|---|---|---|---|
| 10 | Less than or equal to 0.01 percent | | None | |
| 9 | Greater than 0.01 percent and up to 0.03 percent | 9-S | 9-G | 9-P |
| 8 | Greater than 0.03 percent and up to 0.1 percent | 8-S | 8-G | 8-P |
| 7 | Greater than 0.1 percent and up to 0.3 percent | 7-S | 7-G | 7-P |
| 6 | Greater than 0.3 percent and up to 1.0 percent | 6-S | 6-G | 6-P |
| 5 | Greater than 1.0 percent and up to 3.0 percent | 5-S | 5-G | 5-P |
| 4 | Greater than 3.0 percent and up to 10.0 percent | 4-S | 4-G | 4-P |
| 3 | Greater than 10.0 percent and up to 16.0 percent | 3-S | 3-G | 3-P |
| 2 | Greater than 16.0 percent and up to 33.0 percent | 2-S | 2-G | 2-P |
| 1 | Greater than 33.0 percent and up to 50.0 percent | 1-S | 1-G | 1-P |
| 0 | Greater than 50 percent | | None | |

Figure 3:
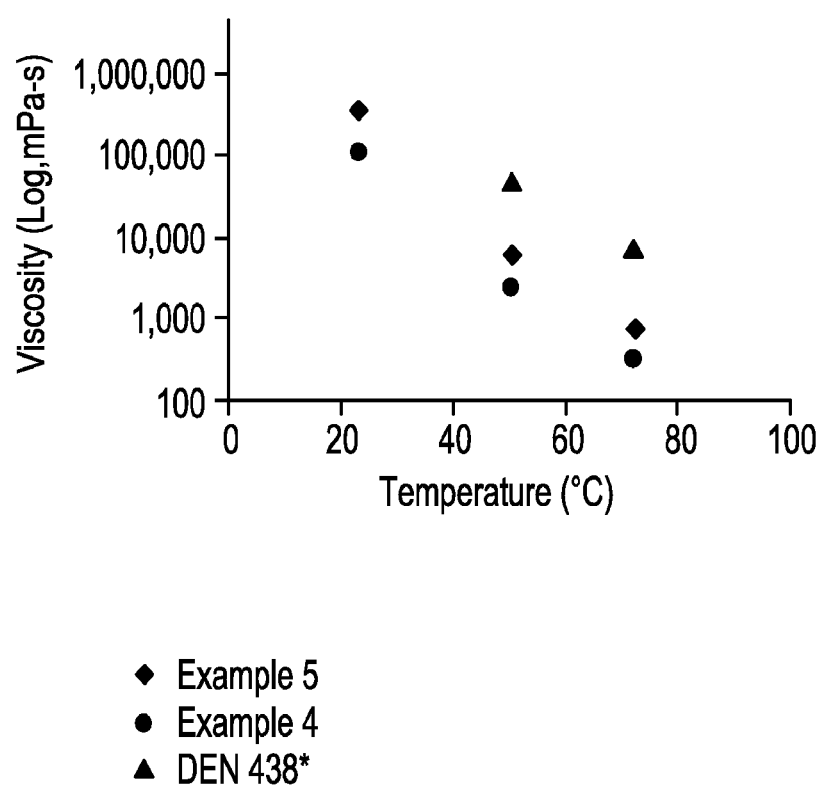
FIG. 3 is a graphical illustration showing the viscosity of a blended composition of the present invention comparing with D.E.N.® 438 at different temperatures. (D.E.N. is a trademark of The Dow Chemical Company.)

Examples 4 and 5 and Comparative Example H—Low Viscosity Epoxy Resin Composition Preparation A blend of 85 wt % D.E.N. 438 with 15 wt % CHDM epoxy resin (Example 4) and a blend of 85 wt % D.E.N. 438 with 15 wt % CHDM epoxy resin (Example 5) were prepared by adding the CHDM based epoxy resin into a pre-warmed D.E.N. 438 at 60° C. The blends were then mixed for two hours at 50-60° C. with a mechanical shaker. The viscosities at different temperatures of the blends were measured and the results are shown in FIG. 3 as compared to the starting epoxy novolac resin D.E.N. 438 (Comparative Example H).

Examples 6 and 7 and Comparative Example I—Curable Coating Formulation Preparation The blends of Examples 4 and 5 were diluted with 10 wt % of Xylene and D.E.N. 438 was diluted with 20 wt % of Xylene (Comparative Example H). Viscosity (Brookfield, DAVII, Spindle 32, adjust torque 25-35% by changing rpm) was measured and reported in Table 3.

Each of the epoxy novolac compositions were formulated as clear coating compositions with GNS GS-530 hardener at 1:1 ratio of epoxy to amine. The clear coating formulations are shown in Table 5. Formulation mixing was conducted with a high speed mixer at 3500 rpm for 1 minute. The inventive coating formulations (Examples 6 and 7) illustrate greater than 50% reduction in solvent versus the formulation of Comparative Example I while maintaining a viscosity appropriate for application.

TABLE 5

Clear Coat Formulations

| Formulated Coating Example<br><br>Epoxy Resin | Example 6<br>Resin from<br>Example 4 | Example 7<br>Resin from<br>Example 5 | Comparative Example I<br>Resin from<br>Comparative Example H |
|---|---|---|---|
| Resin Solution EEW | 185.3 | 191.7 | 220.2 |
| Resin Amount (g) | 60.0 | 60.0 | 60.0 |
| Hardener (GNS530) AHEW | 112 | 112 | 112 |
| Hardener (GNS530) (g) | 36.3 | 35.1 | 30.5 |
| Total (g) | 96.3 | 95.1 | 90.5 |
| Total Xylene Content (wt %) | 6.2 | 6.3 | 13.3 |
| A side Viscosity (mPa-s, Brookfield, 23 C, HADVIII+) | 5,000 | 7,100 | 2,000 |
| Fully Formulated Viscosity (mPa-s, Brookfield, 23 C, HADVIII+) | 2,003 | 2,668 | 1,323 |

Examples 8 and 9 and Comparative Example J—Coating Film Preparation

A curable coating formulation prepared above is applied to a metal panel according to the procedure described in ASTM D4147-99 (2007). The panel is secured on a firm horizontal surface either by taping the top or using a magnetic chuck. An ample amount of coating is poured across the top end of the panel and a 6 mil drawdown bar is placed behind the coating. The bar is then drawn with uniform pressure and speed along the length of the panel toward the operator to apply a uniform film. The wet and dry film coating thickness obtained is dependent on the combination of the bar used, the volume solids of the coating, and the speed of the drawdown motion. After coating, the panels were cured at ambient temperature and humidity for 7 days.

Coating Film Performance Evaluation

Solvent Resistance

Solvent resistance is measured according to the methyl ethyl ketone (MEK) double rub test. The MEK Rub Test was performed according to the procedure described in ASTM D5402. The test was performed using a semi-automatic MEK Rub Test machine made by DJH DESIGNS INC. The testing continued until the coating was rubbed through to the substrate or a maximum of 200 double rubs were completed without breakthrough.

Conical Mandrel Bend Flexibility Test

Mandrel bend tests of coatings were carried out according to the procedure described in ASTM D522 (test method B). A BYK Gardner Conical Mandrel Bending Tester was used to measure the elongation and adhesion of a coated film after a bending stress. The use of the BYK Tester enabled testing of various bending radii (3.2 mm to 38.1 mm) simultaneously. According to this Test, a test panel was bent 180 degrees around the conical mandrel with the coated side up. The panel was then inspected for cracking and/or delamination of the coating from the substrate. Results were measured in terms of the length of cracking or delamination in millimeters from the narrowest (3.2 mm) end of the bend.

Chemical Resistance

The chemical resistance testing of the coatings was done in accordance with the procedure described in ASTM D1308. A couple drops of specified chemicals (including DI water, 3 wt % acetic acid in water, 10 wt % sodium hydroxide solution, 3 wt % sodium chloride in water, toluene, or ethanol) were deposited onto a coated panel. For those specified chemicals with low surface tension or quick evaporation, filter papers (25 mm diameter) were placed on the coatings prior to contacting the coated panel with the specified chemical. Plastic caps were used to cover the resulting droplets of chemicals on the surface of the coated panel or the saturated filter papers. After 24 hours, the chemicals were washed away with water and the panels were dried with paper towels. Coatings were immediately visually inspected for any signs of chemical attack or staining and such inspection was ranked on a 1-5 rating scale. The rating scale was as follows:

| | |
|---|---|
| 5 | No visible effect |
| 4 | Slight blush |
| 3 | Major blush, Slight blister, change in touch |
| 2 | Major blisters |
| 1 | Coating failure |

Cross Hatch Adhesion Test

Adhesion of the coatings on metal substrates was measured according to the procedure described in ASTM D3359-09, Test Method A. For this adhesion test, the coated sample was scribed with a razor (two 40 mm cuts, at a 30-45° angle), cutting through the coating to form an X. Double coated paper tape (3M No. 410) was then applied at the intersection of the cuts with the tape running in the same direction as the smaller angle, pressed down, and then rapidly stripped away. The coating was then visually inspected to determine how much coating was removed from the substrate and such inspection was ranked on a 0A-5A rating scale. The scale was as follows:

| | |
|---|---|
| 5A | No peeling or removal |
| 4A | Trace peeling or removal along incisions or at their intersection |
| 3A | Jagged removal along incision up to 1.6 mm on either side |
| 2A | Jagged removal along most of incisions up to 3.2 mm on either side |
| 1A | Removal from most of the area of the X under the tape |
| 0A | Removal beyond the area of the X |

Pendulum Hardness

Pendulum hardness of a coating was measured using a Pendulum Hardness Tester from BYK Gardner equipped with a König pendulum. The Tester was run according to ISO 1522 and set to measure hardness in seconds. This method evaluates hardness by measuring the damping time in seconds of an oscillating pendulum as its amplitude decreases from 6° to 3°. The pendulum rests with 2 stainless steel balls, 5 mm in diameter, on the coating surface. When the pendulum is set into motion, the balls roll on the surface and put pressure on the coating. Depending on the elasticity of the coating, the damping will be stronger or weaker. If there are no elastic forces, the pendulum will damp stronger.

High elasticity will cause weak damping. In other words, the amplitude of the pendulum oscillations decreases more rapidly with softer coatings resulting in shorter damping times.

TABLE 6

Coating Performance Results

| Cured Coating Example | Example 8 | Example 9 | Comparative Example J |
|---|---|---|---|
| Coating Formulation | Formulation from Example 6 | Formulation from Example 7 | Formulation from Comparative Example I |
| Tg (DSC, ° C.) | 84.1 | 75.9 | 98.6 |
| Gloss (85°) | 97 | 91.8 | 96.7 |
| Gloss (20°) | 73.9 | 26.1 | 59 |
| Pendulum Hardness (4 Days, time in seconds) | 148 | 121 | 135 |
| Pendulum Hardness (7 Days, time in seconds) | 163 | 151 | 143 |
| MEK Double Rub (number of times coating rubbed) | >200 | >200 | >200 |
| Impact (direct, inch.lbs) | 130 | 150 | 100 |
| Impact (indirect, inch.lbs) | 120 | 130 | 20 |
| Conical Bend Flexibility (mm) | 0 | 0 | Totally failed |
| Chemical Spot Test (after 24 hours contact time) | | | |
| 3% Acetic Acid | 5 | 5 | 5 |
| 10% NaOH | 5 | 5 | 5 |
| 10% Sulfuric Acid | 5 | 5 | 5 |
| 3% NaCl | 5 | 5 | 5 |
| Toluene | 5 | 5 | 5 |
| EtOH | 5 | 5 | 5 |
| MeOH | 5 | 5 | 5 |

The cured coatings of the present invention (Examples 8 and 9) illustrate improved impact resistance and flexibility while maintaining hardness and chemical resistance.

The invention claimed is:

1. A curable coating composition comprising:
(a) a blend of at least two epoxy resins comprising (i) at least one 1,4-cyclohexanedimethanol (CHDM) epoxy resin having from about 0.01 to about 1.0 weight percent total chlorine content; and (ii) at least one other epoxy resin other than the epoxy resin in component (i), wherein said at least one other epoxy resin comprises a bisphenol A epoxy resin, an epoxy novolac, a bisphenol F epoxy, a dimer acid or fatty acid modified bisphenol A epoxy, or a mixture thereof;
(b) at least one amine curing agent;
wherein the at least one amine curing agent comprises an ethylene amine, a cycloaliphatic amine, a Mannich base, a phenalkamine, or mixtures thereof; and
wherein the concentration of the amine curing agent comprises an equivalent ratio of amine NH:epoxy of from about 0.5:1 to about 1.5:1; and
wherein the amount of the at least one 1,4-cyclohexanedimethanol (CHDM) epoxy resin to the amount of the at least one other epoxy resin other than the epoxy resin in component (i) is greater than 30 wt % and less than about 70 wt %, based on the total weight of the blend of the at least two epoxy resins.

2. The composition of claim 1, wherein the at least one CHDM epoxy resin composition contains less than about 10 percent CHDM monoglycidyl ether; and less than about 30 percent oligomeric epoxy resin.

3. The composition of claim 1, wherein the at least one CHDM epoxy resin compound comprises 1,4-cyclohexanedimethanol diglycidyl ether.

4. The composition of claim 1, further comprising a third epoxide compound separate and different from the epoxide resin compounds of (a)(i) and (a)(ii); a filler; a reactive diluent; a flexibilizing agent; a processing aide; a toughening agent; or a mixture thereof.

5. A cured thermoset coating prepared from the composition of claim 1.

6. A curable composition of claim 1, wherein the total chlorine content of the at least one 1,4-cyclohexanedimethanol (CHDM) epoxy resin is from about 0.01 wt % to about 0.1 wt %.

7. The composition of claim 1, wherein the amount of the at least one other epoxy resin other than the epoxy resin in component (i) is from about 40 wt % to about 70 wt %.

8. A process for preparing a coating composition comprising:
admixing at least two epoxy resins; wherein a first epoxy resin comprises (i) at least one 1,4-cyclohexanedimethanol (CHDM) epoxy resin having from about 0.01 to about 1.0 weight percent total chlorine content; and wherein a second epoxy resin comprises (ii) at least one other epoxy resin other than the epoxy resin in component (i), wherein said at least one other epoxy resin comprises a bisphenol A epoxy resin, an epoxy novolac, a bisphenol F epoxy, a dimer acid or fatty acid modified bisphenol A epoxy, or a mixture thereof, and at least one amine curing agent wherein the at least one amine curing agent comprises an ethylene amine, a cycloaliphatic amine, a Mannich base, a phenalkamine, or mixtures thereof; and
wherein the concentration of the amine curing agent comprises an equivalent ratio of amine NH:epoxy of from about 0.5:1 to about 1.5:1; wherein the amount of the at least one 1,4-cyclohexanedimethanol (CHDM) epoxy resin to the amount of the at least one other epoxy resin other than the epoxy resin in component (i) is greater than 30 wt % and less than about 70 wt %, based on the total weight of the blend of the at least two epoxy resins.

9. The process of claim 8, wherein the at least one CHDM epoxy resin compound contains less than about 10 percent CHDM monoglycidyl ether; and less than about 30 percent oligomeric epoxy resin.

10. A curable composition of claim 8, wherein the total chlorine content of the at least one 1,4-cyclohexanedimethanol (CHDM) epoxy resin is from about 0.01 wt % to about 0.1 wt %.

11. A process for preparing a cured coating composition comprising:
(I) providing a mixture of:
(a) a blend of at least two or more epoxy resins comprising (i) at least one 1,4-cyclohexanedimethanol (CHDM) epoxy resin having from about 0.01 to about 1.0 weight percent total chlorine content; and (ii) at least one other epoxy resin other than the epoxy resin in component (i), wherein said at least one other epoxy resin comprises a bisphenol A epoxy resin, an epoxy novolac, a bisphenol F epoxy, a dimer acid or fatty acid modified bisphenol A epoxy, or a mixture thereof; and
(b) at least one amine curing agent;
wherein the at least one amine curing agent comprises an ethylene amine, a cycloaliphatic amine, a Mannich base, a phenalkamine, or mixtures thereof; wherein the concentration of the amine curing agent comprises an equivalent ratio of amine NH:epoxy of from about 0.5:1 to about 1.5:1; wherein the amount of the at least one 1,4-cyclohexanedimethanol (CHDM) epoxy resin to the amount of the at least one other epoxy resin other than the epoxy resin in component (i)) is greater than 30 wt % and less than about 70 wt %, based on the total weight of the blend of the at least two epoxy resins; and (II) curing the curable composition of step (I).

12. A curable composition of claim 11, wherein the total chlorine content of the at least one 1,4-cyclohexanedimethanol (CHDM) epoxy resin is from about 0.01 wt % to about 0.1 wt %.

\* \* \* \* \*